United States Patent
Lee et al.

(10) Patent No.: US 11,671,245 B2
(45) Date of Patent: Jun. 6, 2023

(54) SYSTEM ON CHIP, METHOD FOR OPERATING THE SYSTEM ON CHIP AND ELECTRONIC DEVICE INCLUDING THE SYSTEM ON CHIP

(71) Applicant: LG ELECTRONICS INC., Seoul (KR)

(72) Inventors: Sang Hee Lee, Namyangju-si (KR); Youn Ki Ku, Gwangmyeong-si (KR); Sung Min Park, Seoul (KR); Mark Dong Yeon Shin, Seoul (KR); Je Min Woo, Pyeongtaek-si (KR); Ki Young Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 908 days.

(21) Appl. No.: 16/537,918

(22) Filed: Aug. 12, 2019

(65) Prior Publication Data
US 2019/0363880 A1 Nov. 28, 2019

(30) Foreign Application Priority Data

Jul. 10, 2019 (KR) ........................ 10-2019-0083356

(51) Int. Cl.
*H04L 9/08* (2006.01)
*G06N 20/00* (2019.01)
(Continued)

(52) U.S. Cl.
CPC ........ *H04L 9/0819* (2013.01); *G06F 15/7807* (2013.01); *G06F 21/602* (2013.01); *G06N 20/00* (2019.01)

(58) Field of Classification Search
CPC ... H04L 9/0819; G06N 20/00; G06F 15/7807; G06F 21/602
See application file for complete search history.

(56) References Cited

U.S. PATENT DOCUMENTS

2019/0050367 A1* 2/2019 Saur ................... G06F 21/31
2019/0147188 A1* 5/2019 Benaloh ............... G06F 21/602
726/26

FOREIGN PATENT DOCUMENTS

KR 10-2004-0065674 A 7/2004
KR 10-2007-0068505 A 7/2007
WO WO-2018111270 A1 * 6/2018 ............... G01V 1/28

* cited by examiner

*Primary Examiner* — Hee K Song
(74) *Attorney, Agent, or Firm* — Birch, Stewart, Kolasch & Birch, LLP

(57) ABSTRACT

Disclosed herein are a system on chip, a method of operating the system on chip, and an electronic device including the system on chip that execute artificial intelligence (AI) algorithms and/or machine learning algorithms in a 5G environment connected for Internet of Things in order to prevent an artificial intelligence product from being surreptitiously used, replaced, or modified by an attacker. The method for operating the system on chip may include a step of the system on chip receiving an encoded artificial intelligence product, a double-encoded asset key, and a private key distributed using a key exchange scheme, a step of receiving, from an electronic device including the system on chip, a unique key of the electronic device, a step of decoding the double-encoded asset key using the unique key of the electronic device in order to extract an encoded asset key, a step of decoding the encoded asset key using the private key in order to extract an asset key, a step of decoding the encoded artificial intelligence product using the asset key in order to extract an artificial intelligence product, and a step of performing artificial intelligence operation using the artificial intelligence product. It is possible to prevent an artificial intelligence product made by an individual, a company, or an organization from being reproduced and (Continued)

surreptitiously used, replaced, or arbitrarily modified by an attacker.

20 Claims, 4 Drawing Sheets

(51) Int. Cl.
  *G06F 15/78* (2006.01)
  *G06F 21/60* (2013.01)

SYSTEM ON CHIP, METHOD FOR OPERATING THE SYSTEM ON CHIP AND ELECTRONIC DEVICE INCLUDING THE SYSTEM ON CHIP

CROSS-REFERENCE TO RELATED APPLICATION

This present application claims benefit of priority to Korean Patent Application No. 10-2019-0083356, entitled "SYSTEM ON CHIP, METHOD FOR OPERATING THE SYSTEM ON CHIP AND ELECTRONIC DEVICE INCLUDING THE SYSTEM ON CHIP" and filed on Jul. 10, 2019, in the Korean Intellectual Property Office, the entire disclosure of which is incorporated herein by reference.

BACKGROUND

1. Technical Field

The present disclosure relates to a system on chip, a method for operating the system on chip, and an electronic device including the system on chip, and more particularly to a system on chip configured such that a security mechanism is added to hardware capable of accelerating artificial intelligence operation in order to protect an artificial intelligence product made by an individual, a company, or an organization, a method for operating the system on chip, and an electronic device including the system on chip.

2. Description of Related Art

Artificial intelligence functions through an artificial intelligence product made by an individual, a company, or an organization. In the case in which the artificial intelligence product is not appropriately protected, an attacker may easily obtain and reuse the artificial intelligence product. The attacker may change the final result of determination of artificial intelligence to a desired one or may make final result of determination of artificial intelligence malfunction merely by replacing the artificial intelligence product. For example, a trained module of an artificial intelligence algorithm distinguishing between a sheep and a wolf may be replaced in order to mistake the wolf for the sheep. Depending on circumstances, the attacker may easily generate fatal errors.

Prior Art 1 discloses a new security system configured such that security methods distributed for respective hosts are integrated in stages in order to prevent and monitor illegal invasion from outside in stages and to share information about an invader acquired at respective stages, whereby it is possible to prevent invasion from outside in real time.

Prior Art 2 discloses a security authentication apparatus for complexing user authentication of a remote system and separately issuing a disposable security password for every access in order to prevent an authorized user from accessing a control system even when an ID and a password are exposed, whereby it is possible to reinforce security authentication of the control system.

The above information disclosed in this Background section is provided only for enhancement of understanding of the background of the present disclosure and therefore it may contain information that does not form the prior art that is already known in this country to a person of ordinary skill in the art.

PRIOR ART DOCUMENT

Patent Document

Prior Art 1: Korean Patent Application Publication No. 10-2004-0065674 (Jul. 23, 2004)
Prior Art 2: Korean Patent Application Publication No. 10-2007-0068505 (Jul. 2, 2007)

SUMMARY OF THE INVENTION

An object of the present disclosure is to prevent an artificial intelligence product made by an individual, a company, or an organization from being reproduced and surreptitiously used by an attacker.

Another object of the present disclosure is to prevent an artificial intelligence product made by an individual, a company, or an organization from being replaced or arbitrarily modified by an attacker.

Another object of the present disclosure is to protect intellectual property rights of an artificial intelligence product made by an individual, a company, or an organization.

A further object of the present disclosure is to protect a user who receives a service through an artificial intelligence product made by an individual, a company, or an organization.

A method of operating a system on chip according to an embodiment of the present disclosure may include a step of adding a security mechanism to hardware capable of accelerating artificial intelligence operation in order to protect an artificial intelligence product made by an individual, a company, or an organization.

Specifically, the method of operating the system on chip according to the embodiment of the present disclosure may include a step of the system on chip receiving an encoded artificial intelligence product, a double-encoded asset key, and a private key distributed using a key exchange scheme, a step of receiving, from an electronic device including the system on chip, a unique key of the electronic device, a step of decoding the double-encoded asset key using the unique key of the electronic device in order to extract an encoded asset key, a step of decoding the encoded asset key using the private key in order to extract an asset key, a step of decoding the encoded artificial intelligence product using the asset key in order to extract an artificial intelligence product, and a step of performing artificial intelligence operation using the artificial intelligence product.

Conventionally, a server must be in an online state so as to execute an artificial intelligence algorithm, and response speed delay depending on communication may occur. In the case in which an electronic device has no separate security specifications, an attacker may attack the electronic device. In the method of operating the system on chip according to the embodiment of the present disclosure, however, the system on chip executes the artificial intelligence algorithm on the premise that safe key and data exchange are performed between a server and the electronic device, whereby it is possible to protect the artificial intelligence product from the attack of the attacker. In addition, response speed delay depending on server load and communication does not occur, whereby it is possible to safely and rapidly provide the result of the artificial intelligence operation to a user.

The step of receiving the encoded artificial intelligence product may include a step of receiving the encoded artificial intelligence product including at least one of an encoded artificial intelligence algorithm, an encoded trained module, or encoded metadata.

In addition, the step of receiving the encoded artificial intelligence product may include a step of receiving firmware included in the encoded artificial intelligence algorithm so as to be executed by an artificial intelligence acceleration module.

In addition, the step of receiving the encoded artificial intelligence product may include a step of receiving the encoded artificial intelligence product from a storage unit of the electronic device, and the encoded artificial intelligence product may be generated as the result of an external server encoding the artificial intelligence product using the asset key.

The step of receiving the double-encoded asset key may include a step of receiving the double-encoded asset key from the storage unit of the electronic device, and the double-encoded asset key may be generated as the result of the external server encoding an asset key using a public key distributed using the key exchange scheme and the electronic device encoding the encoded asset key using the unique key of the electronic device.

The step of receiving the unique key of the electronic device may include a step of receiving the unique key of the electronic device uniquely assigned to the electronic device at the time of manufacture of the electronic device.

It is possible to prevent an artificial intelligence product made by an individual, a company, or an organization from being reproduced and surreptitiously used, replaced, or arbitrarily modified by an attacker by the provision of the reception step according to this embodiment.

In addition, the method of operating the system on chip according to the embodiment of the present disclosure may further include a step of acquiring the result of the artificial intelligence operation performed using the artificial intelligence product, a step of, in the case in which the result of the artificial intelligence operation is normal, using the result of the artificial intelligence operation, and a step of, in the case in which the result of the artificial intelligence operation is abnormal, canceling the use of the result of the artificial intelligence operation.

It is possible to protect intellectual property rights of an artificial intelligence product made by an individual, a company, or an organization and to protect a user who receives a service through the artificial intelligence product by the provision of the acquisition step, the use step, and the canceling step according to this embodiment.

A system on chip according to an embodiment of the present disclosure may include a security module for receiving an encoded artificial intelligence product, a double-encoded asset key, and a private key distributed using a key exchange scheme, receiving, from an electronic device including the system on chip, a unique key of the electronic device, decoding the double-encoded asset key using the unique key of the electronic device in order to extract an encoded asset key, decoding the encoded asset key using the private key in order to extract an asset key, and decoding the encoded artificial intelligence product using the asset key in order to extract an artificial intelligence product, and an artificial intelligence acceleration module for performing artificial intelligence operation using the artificial intelligence product.

Conventionally, a server must be in an online state so as to execute an artificial intelligence algorithm, and response speed delay depending on communication may occur. In the case in which an electronic device has no separate security specifications, an attacker may attack the electronic device. In the system on chip according to the embodiment of the present disclosure, however, the system on chip executes the artificial intelligence algorithm on the premise that safe key and data exchange are performed between a server and the electronic device, whereby it is possible to protect the artificial intelligence product from the attacker. In addition, response speed delay depending on server load and communication does not occur, whereby it is possible to safely and rapidly provide the result of the artificial intelligence operation to a user.

The security module may receive the encoded artificial intelligence product including at least one of an encoded artificial intelligence algorithm, an encoded trained module, or encoded metadata.

In addition, the security module may receive firmware included in the encoded artificial intelligence algorithm so as to be executed by the artificial intelligence acceleration module.

In addition, the security module may receive the encoded artificial intelligence product from a storage unit of the electronic device, and the encoded artificial intelligence product may be generated as the result of an external server encoding the artificial intelligence product using the asset key.

In addition, the security module may receive the double-encoded asset key from the storage unit of the electronic device, and the double-encoded asset key may be generated as the result of an external server encoding an asset key using a public key distributed using the key exchange scheme and the electronic device encoding the encoded asset key using the unique key of the electronic device.

In addition, the security module may receive the unique key of the electronic device uniquely assigned to the electronic device at the time of manufacture of the electronic device.

It is possible to prevent an artificial intelligence product made by an individual, a company, or an organization from being reproduced and surreptitiously used, replaced, or arbitrarily modified by an attacker by the provision of the security module according to this embodiment.

The system on chip according to the embodiment of the present disclosure may further include a processor for acquiring the result of the artificial intelligence operation performed using the artificial intelligence product, using the result of the artificial intelligence operation in the case in which the result of the artificial intelligence operation is normal, and canceling the use of the result of the artificial intelligence operation in the case in which the result of the artificial intelligence operation is abnormal.

It is possible to protect intellectual property rights of an artificial intelligence product made by an individual, a company, or an organization and to protect a user who receives a service through the artificial intelligence product by the provision of the processor according to this embodiment.

An electronic device according to an embodiment of the present disclosure may include a system on chip, a storage unit for storing an encoded artificial intelligence product, a double-encoded asset key, a unique key of an electronic device, and a private key distributed using a key exchange scheme, and a controller for controlling communication with an external server and providing information stored in the storage unit to the system on chip, wherein the system on chip may include a security module for receiving an encoded artificial intelligence product, a double-encoded asset key, and a private key distributed using a key exchange scheme, receiving, from an electronic device including the system on chip, a unique key of the electronic device, decoding the double-encoded asset key using the unique key of the electronic device in order to extract an encoded asset key, decoding the encoded asset key using the private key in order to extract an asset key, and decoding the encoded artificial intelligence product using the asset key in order to extract an artificial intelligence product, and an artificial intelligence acceleration module for performing artificial intelligence operation using the artificial intelligence product.

It is possible to prevent an artificial intelligence product made by an individual, a company, or an organization from being reproduced and surreptitiously used, replaced, or arbitrarily modified by an attacker by the provision of the electronic device according to this embodiment. Also, it is possible to protect intellectual property rights of an artificial intelligence product made by an individual, a company, or an organization and to protect a user who receives a service through the artificial intelligence product by the provision of the electronic device according to this embodiment.

The encoded artificial intelligence product, received by the security module, may include at least one of an encoded artificial intelligence algorithm, an encoded trained module, or encoded metadata.

In addition, the encoded artificial intelligence product, received by the security module, may further include firmware included in the encoded artificial intelligence algorithm so as to be executed by the artificial intelligence acceleration module.

In addition, the encoded artificial intelligence product, received by the security module, may be received from the storage unit of the electronic device, and the encoded artificial intelligence product may be generated as the result of an external server encoding the artificial intelligence product using the asset key.

In addition, the double-encoded asset key, received by the security module, may be received from the storage unit of the electronic device, and the double-encoded asset key may be generated as the result of the external server encoding an asset key using a public key distributed using the key exchange scheme and the electronic device encoding the encoded asset key using the unique key of the electronic device.

In addition, there may be further provided another method for realizing the present disclosure, another system for realizing the present disclosure, and a computer program for performing the method.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
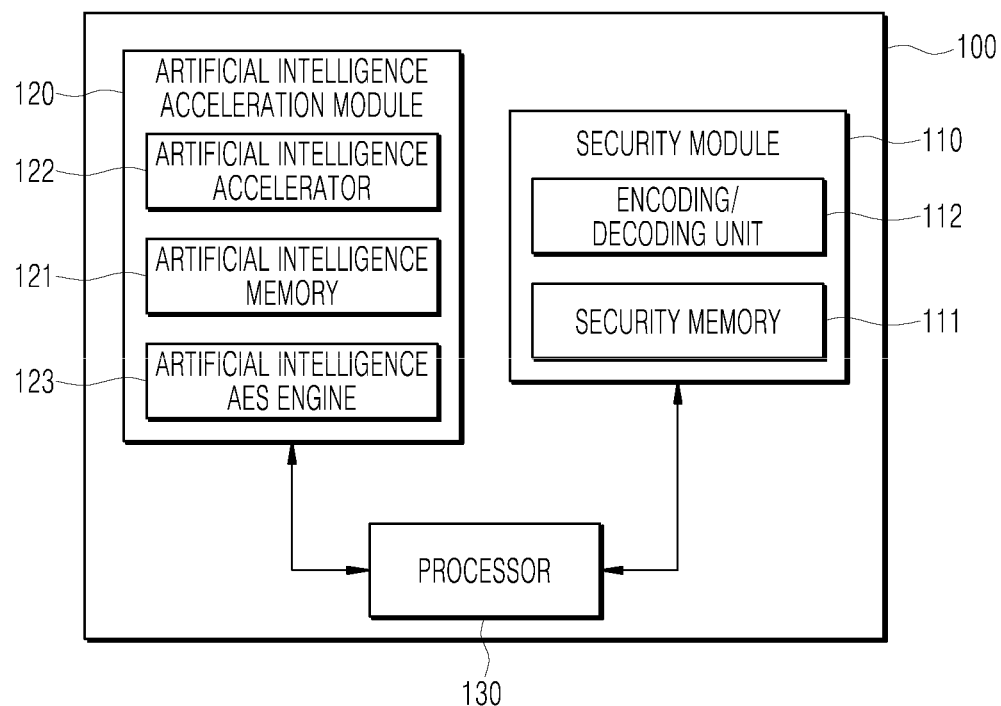
FIG. 1 is a diagram schematically illustrating the construction of a system on chip according to an embodiment of the present disclosure.

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms complete understanding of the present disclosure to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second," and other numerical terms may be used herein only to describe various elements, but these elements should not be limited by these terms. Furthermore, these terms such as "first," "second," and other numerical terms, are used only to distinguish one element from another element.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted.

FIG. 1 is a diagram schematically illustrating the construction of a system on chip according to an embodiment of the present disclosure. The system on chip 100 may include technology integrating various functional blocks, such as a central processing unit (CPU), a memory, an interface, a digital signal processing circuit, and an analog signal processing circuit, in a single semiconductor integrated circuit in order to realize a computing device or another electronic device or a single integrated circuit that is integrated using the above technology.

Referring to FIG. 1, the system on chip 100 may include a security module 110, an artificial intelligence acceleration module 120, and a processor 130.

The security module 110 may receive, from an electronic device 200 (see FIG. 2) including the system on chip 100, an encoded artificial intelligence product, a double-encoded asset key, a unique key of the electronic device, and a private key distributed using a key exchange scheme, may decode the encoded artificial intelligence product, and may transmit the decoded artificial intelligence product to the artificial intelligence acceleration module 120. The security module 110 may include a security memory 111 and an encoding/decoding unit 112.

The security memory 111 may receive and store the encoded artificial intelligence product, the double-encoded asset key, the private key distributed using the key exchange scheme, and the unique key of the electronic device 200 from a storage unit 220 (see FIG. 2) of the electronic device 200.

Here, the artificial intelligence product may include at least one of an encoded artificial intelligence algorithm, an encoded trained module, or encoded metadata, which are made by an individual, a company, or an organization. For example, the artificial intelligence product may include a neural network model, a neural network trained module, and neural network metadata. The neural network model may include description that a neural network algorithm is capable of being executed by a target device (for example, the electronic device 200), and the form of the description may include target execution binary, script, source code, text base description. The neural network trained module may include weight by which the neural network algorithm is trained. The neural network metadata are sub data necessary when the neural network algorithm is executed, and may include, for example, label data.

In addition, the artificial intelligence product may include firmware included in the artificial intelligence algorithm so as to be executed by the artificial intelligence acceleration module 120. Here, the firmware may designate programming commands used to control the artificial intelligence acceleration module 120 when the firmware is executed. The firmware may be improved so as to provide better performance and debugging, and may evolve into new versions.

In this embodiment, a server 300 (see FIG. 3) may encode the artificial intelligence product, received from the individual, the company, or the organization, using the asset key, and may provide the encoded artificial intelligence product to the electronic device 200. In the case in which the electronic device 200 stores the encoded artificial intelligence product in the storage unit 220, the security module 110 may receive the encoded artificial intelligence product from the storage unit 220 of the electronic device 200, and may store the encoded artificial intelligence product in the security memory 111.

In addition, the asset key may be a key that is capable of decoding the encoded artificial intelligence product. The server 300 may encode the asset key using a public key distributed using the key exchange scheme, and may provide the encoded asset key to the electronic device. The electronic device 200 may encode the encoded asset key, received from the server 300, using the unique key of the electronic device 200 (double encoding), and may store the double-encoded asset key in the storage unit 220. The security module 110 may receive the double-encoded asset key from the storage unit 220 of the electronic device 200, and may store the double-encoded asset key in the security memory 111.

In addition, the unique key is a key that is uniquely assigned to the electronic device 200 at the time of manufacture of the electronic device 200. The double-encoded asset key may be decoded using the unique key. The unique key may be stored in the storage unit 220. For example, the unique key may be randomly assigned as a unique number of a main board provided in the electronic device 200 or an ID number of the electronic device 200 at the time of setting of Bluetooth. The unique key is not changeable, and only a developer of the unique key is capable of directly accessing the unique key. The security module 110 may receive the unique key of the electronic device 200, stored in the storage unit 220 of the electronic device 200, and may store the received unique key in the security memory 111.

Here, the security memory 111 may include magnetic storage media or flash storage media. However, the present disclosure is not limited thereto.

The security memory 111 may include an internal memory and/or an external memory, and may include a volatile memory, such as DRAM, SRAM, or SDRAM, a nonvolatile memory, such as one time programmable ROM (OTPROM), PROM, EPROM, EEPROM, mask ROM, flash ROM, a NAND flash memory, or a NOR flash memory, a flash drive, such as an SSD, a compact flash (CF) card, an SD card, a Micro-SD card, a Mini-SD card, an XD card, or a memory stick, or a storage device, such as an HDD.

The encoding/decoding unit 112 may decode the encoded artificial intelligence product using the double-encoded asset key, the unique key, and the private key distributed using the key exchange scheme.

The encoding/decoding unit 112 may decode the double-encoded asset key using the unique key in order to extract an encoded asset key. The encoding/decoding unit 112 may decode the encoded asset key using the private key in order to extract an asset key. The encoding/decoding unit 112 may decode the encoded artificial intelligence product using the asset key in order to extract an artificial intelligence product.

The encoding/decoding unit 112 may decode the double-encoded asset key and the encoded artificial intelligence product using various encoding/decoding algorithms symmetric, asymmetric, hash, and message authentication code (MAC) algorithms). The encoding/decoding unit 112 may transmit the decoded artificial intelligence product to the artificial intelligence acceleration module 120. In an optional embodiment, the encoding/decoding unit 112 may not directly transmit the decoded artificial intelligence product to the artificial intelligence acceleration module 120, but may transmit the decoded artificial intelligence product to the artificial intelligence acceleration module 120 via the processor 130.

The artificial intelligence acceleration module 120 may receive the decoded artificial intelligence product from the security module 110 or via the processor 130, and may perform artificial intelligence operation with respect to the decoded artificial intelligence product. The artificial intelligence acceleration module 120 may include an artificial intelligence memory 121, an artificial intelligence accelerator 122, and an artificial intelligence advanced encryption standard (AES) engine 123.

The artificial intelligence memory 121 may store the decoded artificial intelligence product. In addition, the artificial intelligence memory 121 may store data and execution instruction of a neural network program that is executed by the artificial intelligence accelerator 122.

Here, the artificial intelligence memory 121 may include magnetic storage media or flash storage media. However, the present disclosure is not limited thereto. The artificial intelligence memory 121 may include an internal memory and/or an external memory, and may include a volatile memory, such as DRAM, SRAM, or SDRAM, a nonvolatile memory, such as one time programmable ROM (OTPROM), PROM, EPROM, EEPROM, mask ROM, flash ROM, a NAND flash memory, or a NOR flash memory, a flash drive, such as an SSD, a compact flash (CF) card, an SD card, a Micro-SD card, a Mini-SD card, an XD card, or a memory stick, or a storage device, such as an HDD.

The artificial intelligence accelerator 122 may be, for example, a neural network accelerator, and may accelerate the execution of the neural network program stored in the artificial intelligence memory 121. The artificial intelligence accelerator 122 may execute the neural network program using the decoded artificial intelligence product (the artificial intelligence algorithm, the trained module, and the metadata).

Here, the accelerator may be a processor specialized to calculate a specific pattern, unlike a general-purpose central processing unit (CPU), and may perform calculation more rapidly than a software scheme realized in the CPU. A representative example of the accelerator is a graphics processing unit (GPU). In addition, an Intel Xeon Phi coprocessor or a field programmable gate array (FPGA) may be used.

The artificial intelligence AES engine 123 may encode data generated as the result of the artificial intelligence accelerator 122 executing the neural network program.

The processor 130 may control the overall operation of the system on chip 100. The processor 130 may acquire the result of the artificial intelligence operation (the execution of the artificial intelligence program) performed using the artificial intelligence product in order to determine whether the artificial intelligence operation has been normally performed. The processor 130 may determine whether the artificial intelligence operation has been normally or abnormally performed based on whether the result of the artificial intelligence operation performed using the artificial intelligence product is an abnormal garbage value or not.

In the case in which the result of the artificial intelligence operation is a normal value, the processor 130 may determine that the artificial intelligence operation has been normally performed, and may use the result of the artificial intelligence operation. In the case in which the result of the artificial intelligence operation is a garbage value, however, the processor 130 may determine that the artificial intelligence operation has been abnormally performed, i.e. may determine that there was an attack from an attacker, and may cancel the use of the result of the artificial intelligence operation.

Here, the 'processor' may refer to a data processing device built in a hardware, which includes physically structured circuits in order to perform functions represented as a code or command present in a program. Examples of the data processing device built in a hardware include, but are not limited to, processing devices such as a microprocessor, a central processing unit (CPU), a processor core, a multi-processor, an application-specific integrated circuit (ASIC), a field programmable gate array (FPGA), and the like.

In this embodiment, when the security module 110 performs a security operation, i.e. when the security memory 111 stores data and the encoding/decoding unit 112 performs encoding/decoding, the security module 110 may be operated in an isolated execution environment, in which the security module 110 may safely perform the security operation independently of the artificial intelligence acceleration module 120 and the processor 130. Among the components of the system on chip 100, therefore, it is not possible for the attacker to access the security module 110, whereby the security module 110 may be protected. In addition, since signal transmission and control between the security module 110 and the artificial intelligence acceleration module 120 are performed via the processor 130, the security module 110 may be protected from the attacker. That is, the artificial intelligence memory 121, which stores the decoded artificial intelligence product, may also be protected such that it is not possible for the attacker to access the artificial intelligence memory.

In this embodiment, the system on chip 100 may further include a modem (not shown) for a communication interface, a description of which will follow. Although not shown, the system on chip 100 may further include a timing source, a counter-timer, a real-time timer and power-on reset generator, a debug interface, a JTAG interface, a design for test (DFT) interface, an external interface, an analog interface, a voltage regulator, and a power management circuit. The system on chip 100 may further include a simple bus or an on-chip network based on the use of ARM Advanced Microcontroller Bus Architecture (AMBA) that connects the above blocks to each other, as known in the art to which the present disclosure pertains. Some blocks may be individually packaged according to the design known as package-on-package (PoP) in the art to which the present disclosure pertains, and may be stacked on the system on chip 100. Alternatively, some blocks may be packaged together according to the design known as system-in-package (SiP) in the art to which the present disclosure pertains, even though the blocks are included in a separate integrated circuit (or a die).

Conventionally, the server 300 must be in an online state so as to execute the artificial intelligence algorithm, and response speed delay depending on communication may occur. In the case in which the electronic device 200 has no separate security specifications, the attacker may attack the electronic device. In this embodiment, however, the system on chip 100 executes the artificial intelligence algorithm on the premise that safe key and data exchange are performed between the server 300 and the electronic device 200, whereby it is possible to protect the artificial intelligence product from the attack of the attacker. In addition, response speed delay depending on the load of the server 300 and communication does not occur, whereby it is possible to safely and rapidly provide the result of the artificial intelligence operation to a user.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

An ANN may be classified as a single-layer neural network or a multi-layer neural network, based on the number of layers therein.

An example of an artificial neural network using non-GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Figure 2:
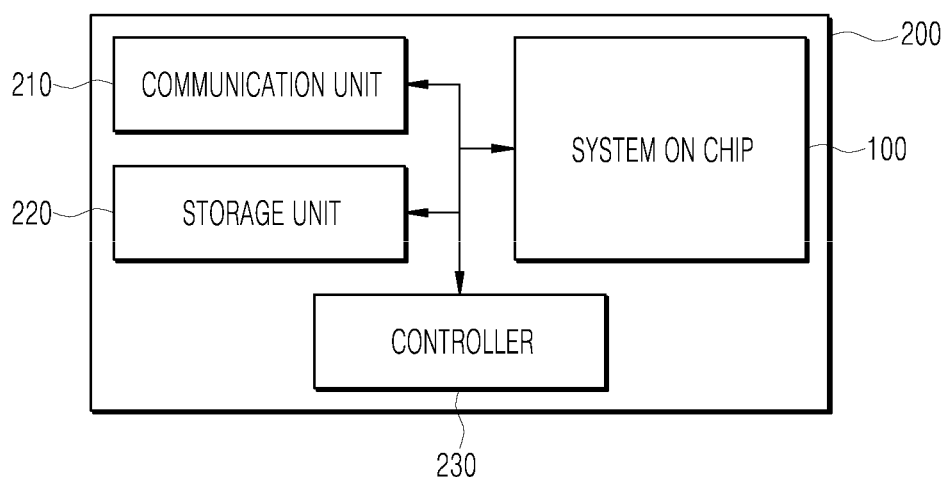
FIG. 2 is a diagram schematically illustrating the construction of an electronic device including the system on chip according to the embodiment of the present disclosure.

FIG. 2 is a diagram schematically illustrating the construction of an electronic device including the system on chip according to the embodiment of the present disclosure. Hereinafter, a description of components that are identical to the components shown in FIG. 1 will be omitted.

Figure 3:
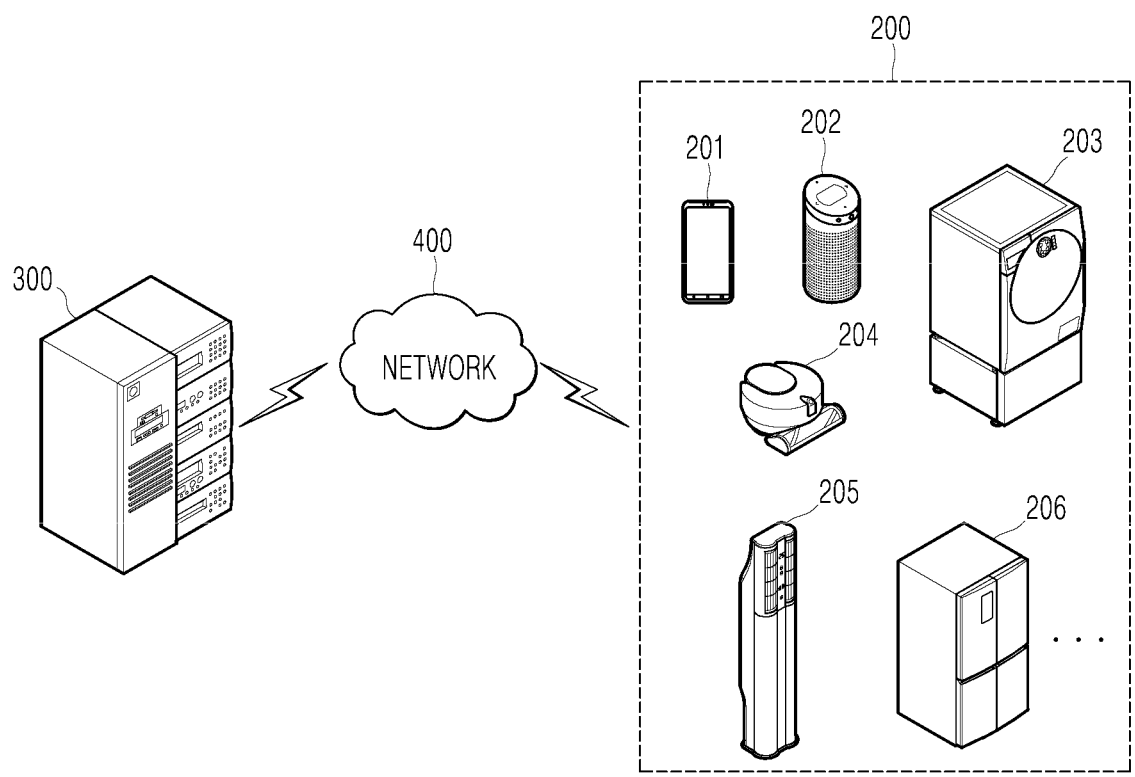
FIG. 3 is a diagram showing an example of a security environment including the electronic device including the system on chip according to the embodiment of the present disclosure, a server, and a network that connects the electronic device and the server to each other.

Referring to FIG. 2, the electronic device 200 may include a system on chip 100, a communication unit 210, a storage unit 220, and a controller 230. In this embodiment, the electronic device 200 may be a device that is capable of processing data, independently executing at least one application, and outputting or storing data generated as the result of executing the application, and may include various home appliances 201 to 206, as shown in FIG. 3. In addition, a detailed description of the system on chip 100 is identical to the above description and thus will be omitted.

The communication unit 210 may provide a communication interface necessary to provide a signal transmitted and received between the electronic device 200 including the system on chip 100 and the server 300 in the form of packet data through operative connection with a network 400 (see FIG. 3). In addition, the communication unit 210 may support various kinds of machine type communication (e.g. Internet of Things (IoT), Internet of Everything (IoE), and Internet of Small Things (IoST)), and may support machine to machine (M2M) communication, vehicle to everything (V2X) communication, device to device (D2D) communication, etc.

The storage unit 220 may store the encoded artificial intelligence product, its own unique key, and the private key distributed using the key exchange scheme, transmitted from the server 300 via the communication unit 210.

The electronic device 200 may receive the encoded asset key from the server 300 via the communication unit 210. The asset key encoded under the control of the controller 230 may be encoded again using the unique key, whereby the double-encoded asset key may be generated, and the double-encoded asset key may be stored in the storage unit 220. To this end, although not shown, the electronic device 200 may further include an encoding/decoding unit (not shown).

Consequently, the storage unit 220 may store the encoded artificial intelligence product, the double-encoded asset key, its own unique key, and the private key distributed using the key exchange scheme. In addition, the storage unit 220 may store control software for operating the electronic device 200.

The controller 230, which is a kind of central processing unit, may operate the control software provided in the storage unit 220 in order to control the overall operation of the electronic device 200. In this embodiment, the controller 230 may control communication with the server 300, and may provide the information stored in the storage unit 220 to the system on chip 100.

In this embodiment, the controller 230 may include all kinds of devices that are capable of processing data, such as a processor. Here, the 'processor' may refer to a data processing device built in a hardware, which includes physically structured circuits in order to perform functions represented as a code or command present in a program. Examples of the data processing device built in a hardware include, but are not limited to, processing devices such as a microprocessor, a central processing unit (CPU), a processor core, a multiprocessor, an application-specific integrated circuit (ASIC), a field programmable gate array (FPGA), and the like.

FIG. 3 is a diagram showing an example of a security environment including the electronic device including the system on chip according to the embodiment of the present disclosure, the server, and the network that connects the electronic device and the server to each other. Hereinafter, a description of components that are identical to the components described with reference to FIGS. 1 and 2 will be omitted.

Referring to FIG. 3, the security environment may include the system on chip 100, the electronic device 200, the server 300, and the network 400.

The system on chip 100 may be provided in the electronic device 200, and may receive an encoded artificial intelligence product, a double-encoded asset key, a private key distributed using the key exchange scheme, and a unique key of the electronic device 200 from the electronic device 200.

The system on chip 100 may decode the double-encoded asset key using the unique key of the electronic device 200 in order to extract an encoded asset key, may decode the encoded asset key using the private key in order to extract an asset key, and may decode the encoded artificial intelligence product using the asset key in order to extract an artificial intelligence product.

The system on chip 100 may perform the artificial intelligence operation using the artificial intelligence product, and may acquire the result of the artificial intelligence operation in order to determine whether the artificial intelligence operation has been normally performed. In the case in which the result of the artificial intelligence operation is a normal value, the system on chip 100 may determine that the artificial intelligence operation has been normally performed, and may use the result of the artificial intelligence operation. In the case in which the result of the artificial intelligence operation is a garbage value, however, the system on chip 100 may determine that the artificial intelligence operation has been abnormally performed, and may cancel the use of the result of the artificial intelligence operation. Hereinafter, a detailed description of the system on chip 100, which is identical to the above description, will be omitted.

The electronic device 200 may include the system on chip 100, may acquire the result of the artificial intelligence operation from the system on chip 100, and may perform control such that the system on chip 100 performs different operations depending on the result of the artificial intelligence operation.

The electronic device 200 may include a user terminal 201, an artificial intelligence speaker 202, a washing machine 203, a robot cleaner 204, an air conditioner 205, and a refrigerator 206. Here, the user terminal 201 may be, but is not limited to, a desktop computer, a smartphone, a laptop computer, a tablet PC, a smart TV, a cellular phone, a personal digital assistant (PDA), a media player, a microserver, a global positioning system (GPS) device, an electronic book terminal, a digital broadcasting terminal, a navigation device, a kiosk, an MP3 player, a digital camera, an electric home appliance, or any of other mobile or immobile computing devices configured to be manipulated by a user. In addition, the user terminal 201 may be a wearable terminal having a communication function and a data processing function, such as a watch, glasses, a hair band, and a ring. The user terminal 201 is not limited thereto. Any terminal that is capable of performing web browsing may be used without limitation. In this embodiment, the electronic device 200 is not limited thereto, and any device that has the system on chip 100 and that is capable of processing data may be included in the electronic device 200.

The server 300 may be a database server that provides big data necessary to apply various artificial intelligence algorithms and data necessary to operate the electronic device 200. In addition, the server 30 may include a web server or an application server that is capable of remotely controlling the operation of the electronic device 200. To this end, an electronic device driving application or an electronic device driving web browser may be provided in the electronic device 200.

In this embodiment, the server 300 may encode an artificial intelligence product, made by an individual, a company, or an organization, using the asset key, and may provide the encoded artificial intelligence product to the electronic device 200. The server 300 may encode the asset key using a public key distributed using the key exchange scheme, and may transmit the encoded asset key to the electronic device 200.

In this embodiment, the server 300 may distribute the key using the key exchange scheme promised with the electronic device 200 in advance. For example, a public key may be distributed to the server and a private key may be distributed to the electronic device 200 using an asymmetric key exchange scheme. Here, the public key may be an encoding key, and the private key may be a decoding key.

The network 400 may function to connect the electronic device 200 and the server 300 to each other. The network 400 may include a wired network, such as a local area network (LAN), a wide area network (WAN), a metropolitan area network (MAN), or an integrated service digital network (ISDN), or a wireless network, such as a wireless LAN, CDMA, Bluetooth, or satellite communication; however, the present disclosure is not limited thereto. In addition, the network 400 may transmit and receive information using short distance communication and/or long distance communication. Here, the short distance communication may include Bluetooth, radio frequency identification (RFID), infrared data association (IrDA), ultra-wideband (UWB), ZigBee, or wireless fidelity (Wi-Fi) technology, and the long distance communication may include code division multiple access (CDMA), frequency division multiple access (FDMA), time division multiple access (TDMA), orthogonal frequency division multiple access (OFDMA), or single carrier frequency division multiple access (SC-FDMA) technology.

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. Access to the network 400 may be provided via one or more wired or wireless access networks. Further, the network 400 may support 5G communication and/or an Internet of things (IoT) network for exchanging and processing information between distributed components such as objects.

Figure 4:
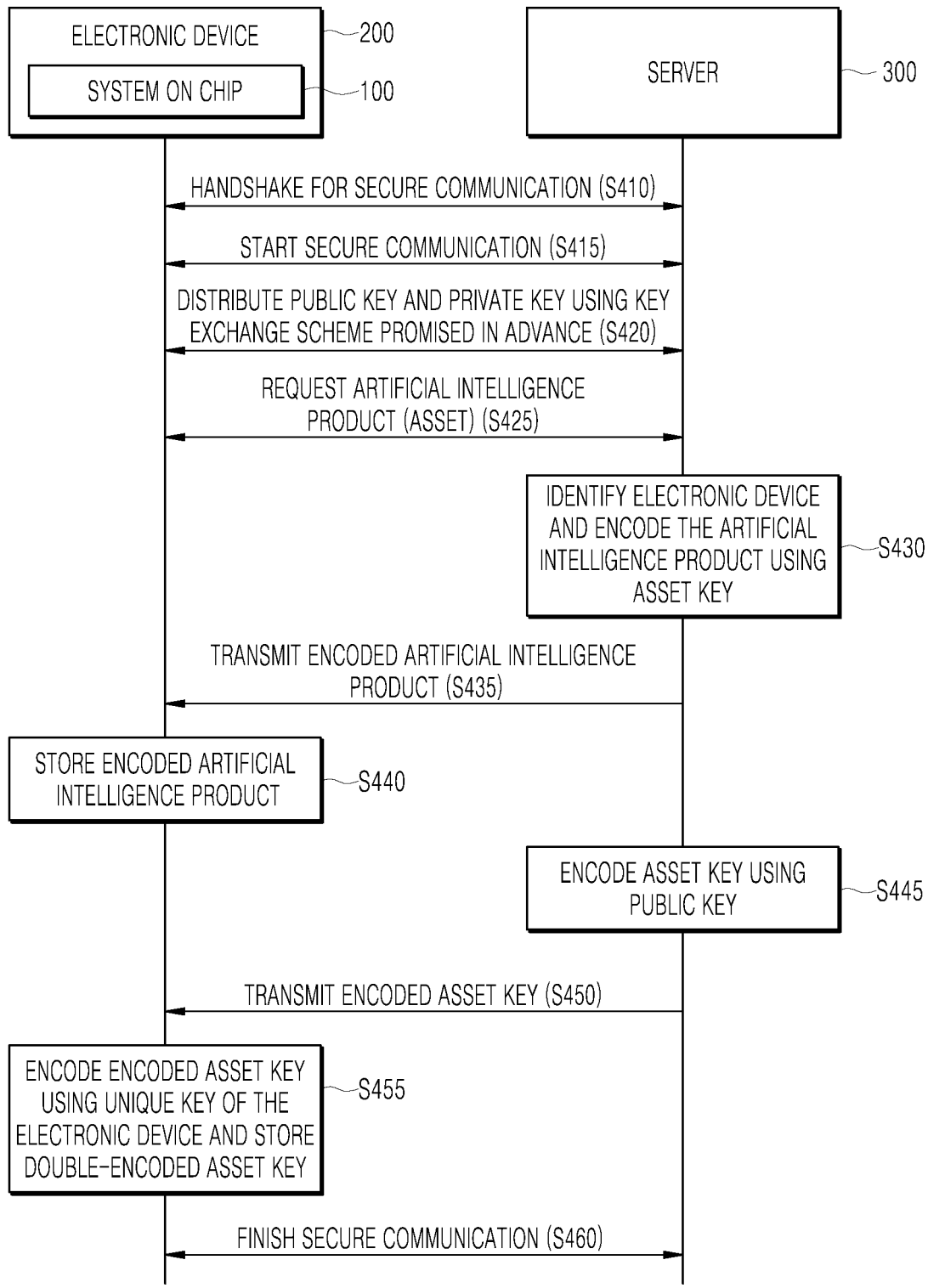
FIG. 4 is a flowchart illustrating a method of transmitting and receiving information between a server according to an embodiment of the present disclosure and the electronic device including the system on chip.

FIG. 4 is a flowchart illustrating a method of transmitting and receiving information between a server according to an embodiment of the present disclosure and the electronic device including the system on chip. Hereinafter, a description of components that are identical to the components described with reference to FIGS. 1 to 3 will be omitted.

Referring to FIG. 4, at step S410, the server 300 performs handshake for secure communication with the electronic device 200. Here, the handshake may mean a packet exchange and confirmation process for reliable connection between the electronic device 200 and the server 300. The handshake may be 3-way handshake or 4-way handshake. The 3-way handshake is a method in which, when the electronic device 200 transmits a SYN packet to the server 300 in order to be initially connected to the server 300, the server 300 receives the packet and then transmits a SYN ACK packet to the electronic device 200, and the electronic device 200 finally transmits an ACK packet to the server 300. When the execution of the 3-way handshake is completed, it may be guaranteed that the electronic device and the server are ready to transmit and receive data to and from each other.

When the execution of the handshake between the server 300 and the electronic device 200 is completed at step S415, the server 300 starts secure communication with the electronic device 200.

At step S420, the server 300 and the electronic device 200 distribute a public key and a private key using a key exchange scheme promised in advance. For example, the public key may be distributed to the server and the private key may be distributed to the electronic device 200 using an asymmetric key exchange scheme.

At step S425, when the key distribution is completed, the electronic device 200 transmits a signal for requesting an artificial intelligence product (an asset) from the server 300.

At step S430, upon receiving the signal for requesting the artificial intelligence product, the server 300 identifies the electronic device 200 and encodes the artificial intelligence product using an asset key in order to generate an encoded artificial intelligence product.

At step S435, the server 300 transmits the encoded artificial intelligence product to the electronic device 200.

At step S440, the electronic device 200 stores the encoded artificial intelligence product received from the server 300.

At step S445, upon receiving a response signal indicating that the reception of the encoded artificial intelligence product is completed from the electronic device 200, the server 300 encodes the asset key using the public key in order to generate an encoded asset key.

At step S450, the server 300 transmits the encoded asset key to the electronic device 200.

At step S455, the electronic device 200 encodes the encoded asset key, received from the server 300, using a unique key of the electronic device 200 in order to generate a double-encoded asset key, and stores the double-encoded asset key therein.

At step S460, upon receiving a response signal indicating that the reception of the encoded asset key is completed from the electronic device 200, the server 300 finishes secure communication with the electronic device 200.

In this embodiment, since the artificial intelligence product is encoded and transmitted to the electronic device 200, it is not possible for an attacker who does not have a decoding key (an asset key) that is capable of decoding the encoded artificial intelligence product to obtain and use the artificial intelligence product. Even when the attacker attempts to replace the encoded artificial intelligence product with another artificial intelligence product, the replaced artificial intelligence product cannot be normally executed in the electronic device 200 due to defense as in this embodiment.

Figure 5:
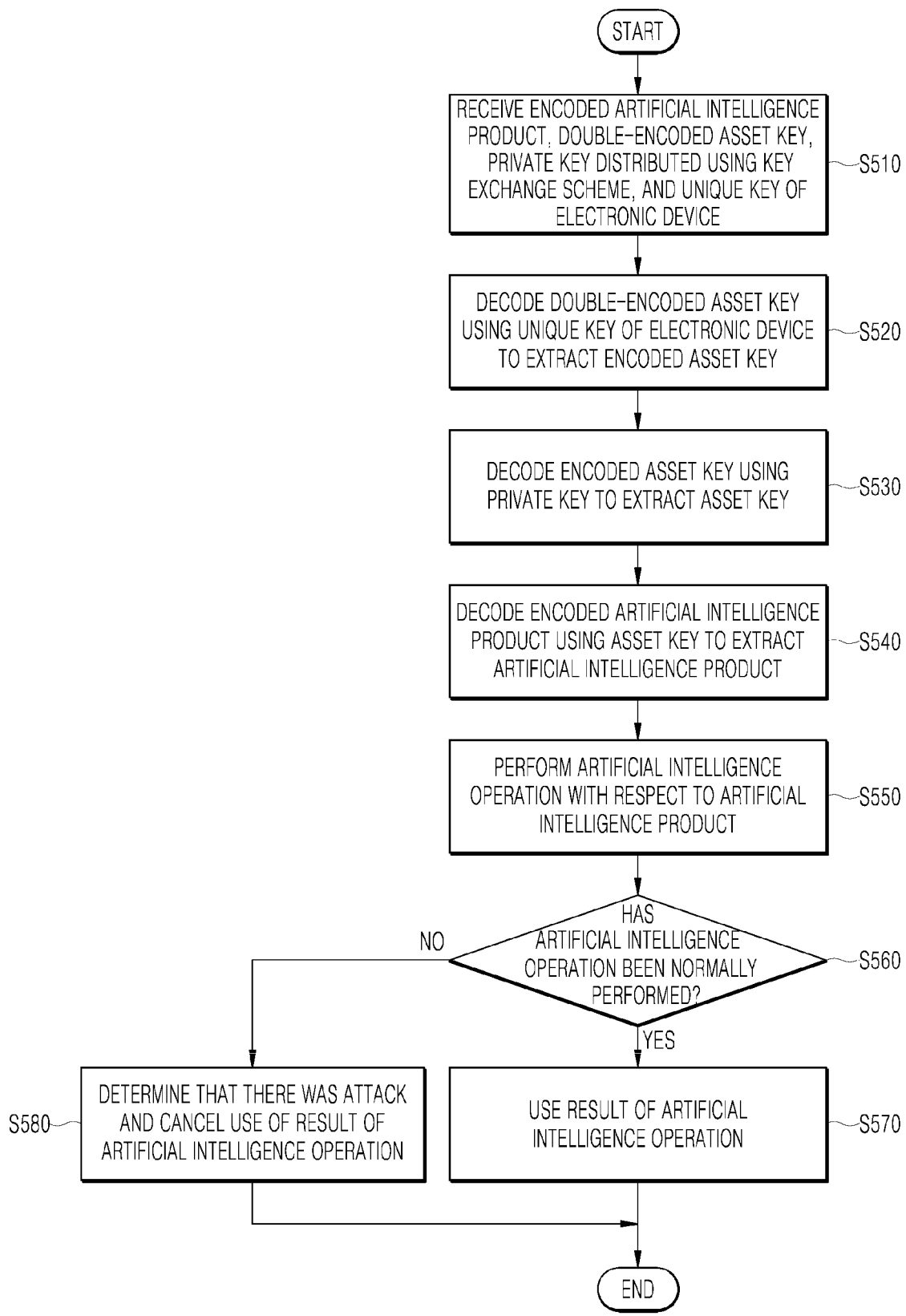
FIG. 5 is a flowchart illustrating a method of operating a system on chip included in an electronic device according to an embodiment of the present disclosure.

FIG. 5 is a flowchart illustrating a method of operating a system on chip included in an electronic device according to an embodiment of the present disclosure. Hereinafter, a description of components that are identical to the components described with reference to FIGS. 1 to 4 will be omitted.

Referring to FIG. 5, at step S510, the system on chip 100 receives an encoded artificial intelligence product, a double-encoded asset key, a unique key of the electronic device, and a private key distributed using the key exchange scheme from the electronic device 200.

At step S520, the system on chip 100 decodes the double-encoded asset key using the unique key of the electronic device 200 in order to extract an encoded asset key.

At step S530, the system on chip 100 decodes the encoded asset key using the private key in order to extract an asset key.

At step S540, the system on chip 100 decodes the encoded artificial intelligence product using the asset key in order to extract an artificial intelligence product.

At step S550, the system on chip 100 performs artificial intelligence operation with respect to the artificial intelligence product.

At step S560, the system on chip 100 determines whether the artificial intelligence operation has been normally performed. The system on chip 100 may determine whether the artificial intelligence operation has been normally or abnormally performed based on whether the result of the artificial intelligence operation performed using the artificial intelligence product is an abnormal garbage value or not.

At step S570, in the case in which the result of the artificial intelligence operation is a normal value, the system on chip 100 determines that the artificial intelligence operation has been normally performed, and uses the result of the artificial intelligence operation.

At step S580, in the case in which the result of the artificial intelligence operation is a garbage value, the system on chip 100 determines that the artificial intelligence operation has been abnormally performed, i.e. determines that there was an attack from an attacker, and cancels the use of the result of the artificial intelligence operation.

As is apparent from the above description, the present disclosure has the following effects.

Conventionally, a server must be in an online state so as to execute an artificial intelligence algorithm, and response speed delay depending on communication may occur. In the case in which an electronic device has no separate security specifications, an attacker may attack the electronic device. In the present disclosure, however, a system on chip executes an artificial intelligence algorithm on the premise that safe key and data exchange are performed between a server and an electronic device, whereby it is possible to protect an artificial intelligence product from an attacker. In addition, response speed delay depending on server load and communication does not occur, whereby it is possible to safely and rapidly provide the result of the artificial intelligence operation to a user.

In addition, it is possible to prevent an artificial intelligence product made by an individual, a company, or an organization from being reproduced and surreptitiously used by an attacker.

In addition, it is possible to prevent an artificial intelligence product made by an individual, a company, or an organization from being replaced or arbitrarily modified by an attacker.

In addition, it is possible to protect intellectual property rights of an artificial intelligence product made by an individual, a company, or an organization.

In addition, it is possible to protect a user who receives a service through an artificial intelligence product made by an individual, a company, or an organization.

It should be noted that the effects of the present disclosure are not limited to the effects mentioned above, and other unmentioned effects will be clearly understood by those skilled in the art from the above description of the present disclosure.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof. It should be apparent to those skilled in the art that various substitutions, changes and modifications which are not exemplified herein but are still within the spirit and scope of the present disclosure may be made.

The present disclosure is thus not limited to the example embodiments described above, and rather intended to include the following appended claims, and all modifications, equivalents, and alternatives falling within the spirit and scope of the following claims.

What is claimed is:

1. A method for operating a system on chip, the method comprising:
    the system on chip receiving an encoded artificial intelligence product, a double-encoded asset key, and a private key distributed using a key exchange scheme;

receiving, from an electronic device comprising the system on chip, a unique key of the electronic device;
decoding the double-encoded asset key using the unique key of the electronic device in order to extract an encoded asset key;
decoding the encoded asset key using the private key in order to extract an asset key;
decoding the encoded artificial intelligence product using the asset key in order to extract an artificial intelligence product; and
performing an artificial intelligence operation using the artificial intelligence product.

2. The method according to claim 1, wherein the receiving the encoded artificial intelligence product comprises receiving the encoded artificial intelligence product comprising at least one of an encoded artificial intelligence algorithm, an encoded trained module, or encoded metadata.

3. The method according to claim 2, wherein the receiving the encoded artificial intelligence product comprises receiving firmware included in the encoded artificial intelligence algorithm so as to be executed by an artificial intelligence acceleration module.

4. The method according to claim 1, wherein
the receiving the encoded artificial intelligence product comprises receiving the encoded artificial intelligence product from a storage unit of the electronic device, and
the encoded artificial intelligence product is generated as a result of an external server encoding the artificial intelligence product using the asset key.

5. The method according to claim 1, wherein
the receiving the double-encoded asset key comprises receiving the double-encoded asset key from a storage unit of the electronic device, and
the double-encoded asset key is generated as a result of an external server encoding an asset key using a public key distributed using the key exchange scheme and the electronic device encoding the encoded asset key using the unique key of the electronic device.

6. The method according to claim 1, wherein the receiving the unique key of the electronic device comprises receiving the unique key of the electronic device uniquely assigned to the electronic device at a time of manufacture of the electronic device.

7. The method according to claim 1, further comprising:
acquiring a result of the artificial intelligence operation performed using the artificial intelligence product;
in a case in which the result of the artificial intelligence operation is normal, using the result of the artificial intelligence operation; and
in a case in which the result of the artificial intelligence operation is abnormal, canceling use of the result of the artificial intelligence operation.

8. A computer program stored in a computer-readable recording medium to cause a computer to perform the method according to claim 1.

9. A system on chip comprising:
a processor for security configured to receive an encoded artificial intelligence product, a double-encoded asset key, and a private key distributed using a key exchange scheme, to receive, from an electronic device comprising the system on chip, a unique key of the electronic device, to decode the double-encoded asset key using the unique key of the electronic device in order to extract an encoded asset key, to decode the encoded asset key using the private key in order to extract an asset key, and to decode the encoded artificial intelligence product using the asset key in order to extract an artificial intelligence product; and
a processor for artificial intelligence acceleration configured to perform artificial intelligence operation using the artificial intelligence product.

10. The system on chip according to claim 9, wherein the processor for security receives the encoded artificial intelligence product comprising at least one of an encoded artificial intelligence algorithm, an encoded trained module, or encoded metadata.

11. The system on chip according to claim 10, wherein the processor for security receives firmware included in the encoded artificial intelligence algorithm so as to be executed by the processor for artificial intelligence acceleration.

12. The system on chip according to claim 9, wherein
the processor for security receives the encoded artificial intelligence product from a storage unit of the electronic device, and
the encoded artificial intelligence product is generated as a result of an external server encoding the artificial intelligence product using the asset key.

13. The system on chip according to claim 9, wherein
the processor for security receives the double-encoded asset key from a storage unit of the electronic device, and
the double-encoded asset key is generated as a result of an external server encoding an asset key using a public key distributed using the key exchange scheme and the electronic device encoding the encoded asset key using the unique key of the electronic device.

14. The system on chip according to claim 9, wherein the processor for security receives the unique key of the electronic device uniquely assigned to the electronic device at a time of manufacture of the electronic device.

15. The system on chip according to claim 9, further comprising a processor configured to acquire a result of the artificial intelligence operation performed using the artificial intelligence product, to use the result of the artificial intelligence operation in a case in which the result of the artificial intelligence operation is normal, and to cancel use of the result of the artificial intelligence operation in a case in which the result of the artificial intelligence operation is abnormal.

16. An electronic device comprising:
a system on chip;
a storage unit configured to store an encoded artificial intelligence product, a double-encoded asset key, a unique key of an electronic device, and a private key distributed using a key exchange scheme; and
a controller configured to control communication with an external server and providing information stored in the storage unit to the system on chip, wherein
the system on chip comprises:
a processor for security configured to receive an encoded artificial intelligence product, a double-encoded asset key, and a private key distributed using a key exchange scheme, to receive, from an electronic device comprising the system on chip, a unique key of the electronic device, to decode the double-encoded asset key using the unique key of the electronic device in order to extract an encoded asset key, to decode the encoded asset key using the private key in order to extract an asset key, and to decode the encoded artificial intelligence product using the asset key in order to extract an artificial intelligence product; and a processor for artificial intelligence acceleration configured to perform artificial intelligence operation using the artificial intelligence product.

17. The electronic device according to claim 16, wherein the encoded artificial intelligence product, received by the processor for security, comprises at least one of an encoded artificial intelligence algorithm, an encoded trained module, or encoded metadata.

18. The electronic device according to claim 17, wherein the encoded artificial intelligence product, received by the processor for security, further comprises firmware included in the encoded artificial intelligence algorithm so as to be executed by the processor for artificial intelligence acceleration.

19. The electronic device according to claim 16, wherein
the encoded artificial intelligence product, received by the processor for security, is received from the storage unit of the electronic device, and
the encoded artificial intelligence product is generated as a result of an external server encoding the artificial intelligence product using the asset key.

20. The electronic device according to claim 16, wherein
the double-encoded asset key, received by the processor for security, is received from the storage unit of the electronic device, and
the double-encoded asset key is generated as a result of an external server encoding an asset key using a public key distributed using the key exchange scheme and the electronic device encoding the encoded asset key using the unique key of the electronic device.

* * * * *